Patented May 9, 1944

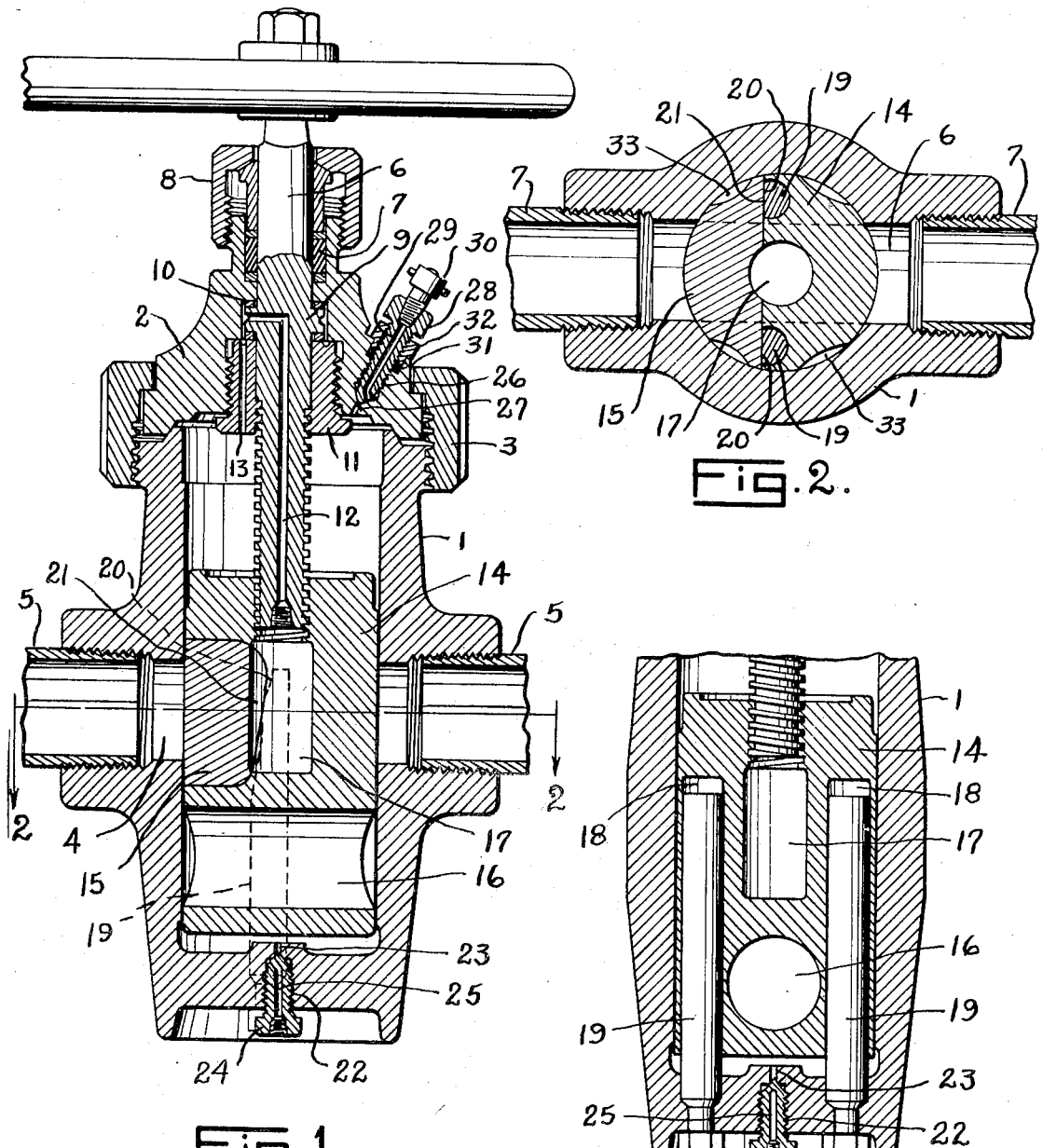

2,348,642

UNITED STATES PATENT OFFICE 2,348,642

LUBRICATING SYSTEM FOR VALVE ASSEMBLIES

Arthur J. Penick and Kirby T. Penick, Houston, Tex.

Application July 11, 1941, Serial No. 401,980

2 Claims. (Cl. 251—51)

This invention relates to a lubricating system for valve assemblies.

The invention herein described embodies certain improvements over that type of valve assembly disclosed in Patent No. 2,219,271 issued October 22, 1940.

An object of the invention is to provide in a valve assembly a system for lubricating the movable parts of the assembly.

As disclosed in the patent above referred to means were provided for introducing a lubricant into the valve casing but no means were provided for permitting the escape of air, liquid or foreign matter from the casing while the lubricant was being introduced; therefore, in the type of valve disclosed in said patent said air, water or other foreign matter would become entrapped in the casing and consequently the casing would only be partly filled with the lubricant and the valve assembly would thus be only partially lubricated. Furthermore, no means were provided for allowing the cleansing of the interior of the valve casing, and the movable parts of waste lubricant, foreign matter and the like before introducing the fresh lubricant.

It is a further object of the present invention to provide means whereby the interior of the valve assembly, including the movable parts thereof, may be thoroughly cleansed, if necessary, and whereby a fresh lubricant may be admitted into the valve casing and the waste lubricant, air, water and other foreign matter may be simultaneously discharged ahead of the fresh lubricant to the end that the valve assembly may be, when desired, completely filled with a fresh, clean, lubricant and the valve casing then closed to prevent the escape of the lubricant.

While the present invention has been illustrated in connection with that general type of valve disclosed by said patent the lubricating system may be employed on valves generally having an enclosed casing and a movable controlling assembly therein.

With the above and other objects in view the invention has particular relation to certain novel features of construction, operation and arrangement of parts, an example of which is given in this specification and illustrated in the accompanying drawing, wherein:

Figure 1 shows a longitudinal sectional view of the complete assembly.

Figure 2 shows a cross-sectional view taken on the line 2—2 of Figure 1, and

Figure 3 shows a fragmentary longitudinal sectional view taken at right angles to the view shown in Figure 1.

Referring now more particularly to the drawing wherein like numerals of reference designate the same parts in each of the figures, the numeral 1 designates the valve casing substantially cylindrical in shape and, in the present illustration, shown permanently closed at one end thereof and having the bonnet 2 closing the other end thereof and secured thereon by means of the flange nut 3 which has a threaded connection with the casing.

The casing 1 has a flowway 4 extending transversely therethrough into which the adjacent sections 5, 5 of the flow line are screwed.

Extended axially through the bonnet 2 there is a valve stem 6 and surrounding this valve stem in the outer end of the bonnet there is a stuffing box 7 which is retained in place, and the compression on which is regulated by the flange nut 8 which is screwed onto the bonnet and which surrounds the stem. The stem is rotatable in the bonnet but is retained therein against longitudinal movement by means of an annular rib 9 on the stem which is retained on one side by the inside annular shoulder 10 and on the other side by the inside gland 11. The rib is annularly grooved externally and leading from said groove radially and then extending axially through the stem to the inner end thereof there is a lubricant channel 12 whose inner end is enlarged and internally threaded, as shown in Figure 1. There is also a channel 13 extending through the gland 11 from end to end thereof through which a lubricant may pass from the groove in said rib into the interior of the casing 1 and vice versa.

In the present illustration there is a controlling assembly fitted closely within the valve casing and comprising a cylindrical carrier 14 having a movable, independent side segment therein forming a valve 15. The carrier 14 has a passageway 16 therethrough which may be moved into and out of registration with the flowway 4. At one end the carrier and valve have the axial bore 17 one end of which is internally coarsely threaded and the inner end of the stem 6 is externally coarsely threaded and in mesh with the internal threads of said bore. At its other end the carrier 14 has the oppositely disposed longitudinal bores 18, 18 on opposite sides of the passageway 16. Guides 19, 19 are anchored to the permanently closed end of the valve casing and extend inwardly into the bores 18. These guides may be anchored to the end of the casing in any preferred manner. The inner ends of the guides 19 have the tapering faces 20 as shown more accurately in Figures 1 and 2 and the valve 15 has the inside tapering faces 21 positioned to cooperate with the corresponding faces 20.

The controlling assembly, in the present illustration, may be actuated by an appropriate rotation of the stem 6. When it is desired to close the valve, the stem may be turned to carry the passageway 16 out of registration with the flowway 4 and to move the valve 15 into registration with said flowway. The valve will move with the carrier and when the valve registers with the flowway 4, the tapering faces 21 of the valve will come into contact with the tapering faces 20 of the guides 19 and upon further rotation of the stem, in the same direction, the valve 15 will be moved outwardly into close contact with the inside of the casing around said flowway 4 and the carrier 14 will be moved in the opposite direction into close contact with the opposite side of the casing around said flowway and fluid tight joints will thus be formed around the flowway 4.

Upon rotation of the stem in the opposite direction the controlling assembly will be moved in the opposite direction, thus causing the tapering faces 21 to release the tapering faces 20 and said assembly may be then readily removed in the reversed direction until the passageway 16 aligns with the flowway 4 and a smooth continuously unobstructed passageway will be provided for the flow of fluid through the valve casing.

The closed end of the casing has an internally threaded socket 22 and leading forwardly from the inner end of said socket into the casing there is a reduced duct 23. A plug 24 may be screwed into the socket 22. The inner end of this plug is tapered and when the plug is fully screwed home the duct 23 will be closed by it. The plug 24 has an axial inlet passageway 25 whose outer end is internally threaded to receive a grease gun connection and its inner end is overturned so that when the plug is fully screwed home, said inner end will be closed as shown in Figures 1 and 3.

The bonnet 2 has an internally threaded socket 26 and leading inwardly from the inner end of said socket into the casing there is a reduced duct 27. A plug 28 may be screwed into the socket 26. The inner end of this plug is tapered and when the plug is fully screwed home the duct 27 will be closed by it. The plug 28 has an axial inlet passageway 29 whose outer end is internally threaded to receive a conventional grease gun connection 30 and its inner end is overturned so that when the plug is fully screwed home said inner end will be closed as shown in Figure 1.

Countersunk into the outer end of the socket 26 and surrounding the plug 28 there is an annular seal ring 31. Screwed onto the plug 28 there is a clamp nut 32 whose inner end is reduced forming an annular rib which engages against said seal ring 31, when the nut is screwed home, to form a seal around the plug 28 to prevent the escape of lubricant under pressure around the plug 28.

Before the bonnet 2 is assembled with the casing but after the stem is assembled with said bonnet and before the stem is screwed into the carrier 14, a grease gun may be connected to the internally threaded end of the duct 12 and a lubricant forced through said duct 12 so as to completely fill the bearing between the stem and the bonnet. The assembly may then be completed and the plugs 24, 28 partly unscrewed and a grease gun may be attached to the connection 30 and a lubricant may be forced into the casing 1 which will flow through the external longitudinal grooves 33 of the carrier so as to completely fill the interior of the casing on both sides of the valve carrier, air meanwhile escaping out through the duct 25. The valve assembly will thus be completely lubricated and the plugs 24, 28 may then be screwed home to close the ducts 25, 29.

After a period of use the lubricant will become dissipated and contaminated with water scale and other foreign matter at which time the assembly should be again supplied with a fresh lubricant. This may be accomplished by turning the plugs 24, 28 so as to open the ducts 25, 29 and a grease gun attached to the connection 30, as before, and fresh lubricant may be forced into the valve casing, the air, water and foreign matter escaping through the open duct 25 to allow the casing to completely fill and in this instance the lubricant will also pass through the duct 13 to fully lubricate the stem bearing. In order to assure the complete filling of the casing during this operation it may be found desirable to reciprocate the carrier 14 back and forth which may be done by a suitable rotation of the stem 6.

The plugs 24, 28 may then be screwed home to close the ducts 25, 29 so as to prevent the escape of the lubricant through said ducts.

At times, prior to the filling of the valve casing with fresh lubricant, it may be found desirable to wash out, or cleanse, the interior of the valve assembly so as to remove all waste lubricant, water and foreign matter therefrom. In such event the plugs 24, 28 may be partly unscrewed and the clamp nut 8 may also be partly unscrewed and gasoline, hot steam or other washing fluid may be forced under pressure through either of the plugs 24 or 28 and said undesired matter will be discharged from the casing through the duct of the other plug and also, with the clamp nut 8 loosened, the washing fluid will pass through the stem bearing and thoroughly cleanse the same. The valve casing may then be filled with the clean lubricant in the manner hereinabove explained.

The drawing and description are illustrative merely while the broad principle of the invention will be defined by the appended claims.

What I claim is:

1. A valve assembly comprising a casing having a flowway therethrough, a controlling assembly in the casing movable to control the flowway, a stem connected with the controlling assembly and accessible to an operator and having a bearing in the casing, means on one side of the controlling assembly for the admission of a washing fluid into the interior of the casing, said valve assembly having channels, one by-passing the controlling assembly and the other leading through the stem and arranged to conduct the washing fluid through said bearing whereby a cleansing fluid may be circulated throughout the interior of the casing to cleanse the same of waste and foreign matter.

2. A valve assembly comprising a casing having a flowway therethrough, a controlling assembly in the casing movable to control the flowway, a stem connected with the controlling assembly and accessible to an operator and having a bearing in the casing, means on one side of the controlling assembly for the admission of a washing fluid into the interior of the casing, said valve assembly having channels, one by-passing the controlling assembly and the other leading through the stem into the bearing and thence into the interior of the casing and arranged to conduct the washing fluid through said bearing whereby a cleansing fluid may be circulated throughout the interior of the casing to cleanse the same of waste and foreign matter, said casing having a controlled outlet whereby the waste and foreign matter in the casing may be expelled therefrom by the washing fluid.

ARTHUR J. PENICK.
KIRBY T. PENICK.